United States Patent
Nam et al.

(10) Patent No.: US 9,771,833 B2
(45) Date of Patent: Sep. 26, 2017

(54) HYDROSTATIC TEST DEVICE AND HYDROSTATIC TEST METHOD FOR HIGH PRESSURE TURBINE

(71) Applicant: DOOSAN HEAVY INDUSTRIES & CONSTRUCTION CO., LTD., Gyeongsangnam-do (KR)

(72) Inventors: Ki Young Nam, Gyeongsangnam-do (KR); Seung Hack Baek, Gyeongsangnam-do (KR); Ho Joo Song, Gyeongsangnam-do (KR)

(73) Assignee: DOOSAN HEAVY INDUSTRIES & CONSTRUCTION CO., LTD., Gyeongsangnam-Do (KR)

( * ) Notice: Subject to any disclaimer, the term of this patent is extended or adjusted under 35 U.S.C. 154(b) by 494 days.

(21) Appl. No.: 14/572,354

(22) Filed: Dec. 16, 2014

(65) Prior Publication Data
US 2015/0198498 A1    Jul. 16, 2015

(30) Foreign Application Priority Data

Jan. 15, 2014    (KR) ........................ 10-2014-0005192

(51) Int. Cl.
| | |
|---|---|
| *G01M 3/04* | (2006.01) |
| *F01K 13/00* | (2006.01) |
| *G01M 3/02* | (2006.01) |
| *G01M 99/00* | (2011.01) |

(52) U.S. Cl.
CPC ........... *F01K 13/003* (2013.01); *G01M 3/022* (2013.01); *G01M 3/025* (2013.01); *G01M 99/007* (2013.01)

(58) Field of Classification Search
CPC .. G01M 3/022; G01M 3/2876; G01M 3/2853; G01M 3/025; G01M 3/2815; G01M 3/2861; G01M 3/26; G01M 3/04; G01M 3/3236; F02M 25/0809; F02M 25/0818; E21B 47/1025
USPC .......... 73/40, 49.8, 49.7, 40.5 R, 46; 138/89, 138/90; 277/641
See application file for complete search history.

(56) References Cited

U.S. PATENT DOCUMENTS

| | | | | |
|---|---|---|---|---|
| 1,424,094 | A * | 7/1922 | Gunn | F16K 1/46 251/114 |
| 2,764,311 | A * | 9/1956 | Blackman | F16J 15/121 277/641 |
| 3,483,894 | A * | 12/1969 | Finocchiaro | F16L 55/132 138/90 |
| 4,100,629 | A * | 7/1978 | Jones | B64D 11/02 138/89 |
| 4,387,740 | A | 6/1983 | Vanzant | |
| 4,398,695 | A * | 8/1983 | Torche | F16K 1/2266 137/72 |

(Continued)

FOREIGN PATENT DOCUMENTS

| | | |
|---|---|---|
| CN | 201885873 U | 6/2011 |
| KR | 20-0342839 Y1 | 2/2004 |

(Continued)

*Primary Examiner* — John Fitzgerald
*Assistant Examiner* — Truong D Phan
(74) *Attorney, Agent, or Firm* — Baker & McKenzie LLP (57) ABSTRACT

A hydrostatic test device for a turbine may include a plurality of feeding holes having a groove part formed with a greater diameter. Sealing members may be fitted into feeding holes in upper or lower casings of a turbine to seal the feeding holes.

19 Claims, 7 Drawing Sheets

(56) References Cited

U.S. PATENT DOCUMENTS

| | | | | |
|---|---|---|---|---|
| 4,796,423 A * | 1/1989 | Lievestro | | F01D 9/04 403/209 |
| 5,033,510 A * | 7/1991 | Huber | | E03F 7/02 137/68.19 |
| 5,224,515 A * | 7/1993 | Foster | | B65D 59/06 138/89 |
| 5,235,138 A * | 8/1993 | Shah | | H02G 3/22 138/89 |
| 5,771,936 A * | 6/1998 | Sasaki | | F15B 1/103 138/30 |
| 6,769,291 B1 * | 8/2004 | Julian | | G01M 3/022 138/90 |
| 7,340,814 B2 * | 3/2008 | Bruehwiler | | B25B 27/143 29/240.5 |
| 9,046,004 B2 * | 6/2015 | Casavant | | F01D 25/243 |
| 2003/0037830 A1 | 2/2003 | Lee | | |
| 2003/0098080 A1 * | 5/2003 | McGivery | | F16L 55/132 138/89 |
| 2008/0012241 A1 * | 1/2008 | Norman | | F01D 11/00 277/616 |
| 2011/0038723 A1 * | 2/2011 | Lochner | | F01D 25/145 415/200 |
| 2012/0139190 A1 * | 6/2012 | Doyle | | B23P 11/02 277/639 |
| 2012/0163963 A1 * | 6/2012 | Hashimoto | | F01D 25/243 415/182.1 |
| 2013/0224005 A1 * | 8/2013 | Casavant | | F01D 25/243 415/200 |

FOREIGN PATENT DOCUMENTS

| | | |
|---|---|---|
| KR | 10-2007-0093187 A | 9/2007 |
| KR | 10-2007-0106257 A | 11/2007 |

* cited by examiner

HYDROSTATIC TEST DEVICE AND HYDROSTATIC TEST METHOD FOR HIGH PRESSURE TURBINE

CROSS-REFERENCE TO RELATED APPLICATIONS

This application claims priority to Korean Application No. 10-2014-0005192, filed Jan. 15, 2014, the contents of which are incorporated herein in their entirety.

BACKGROUND

The present disclosure relates to a hydrostatic test device and a hydrostatic test method for a high pressure turbine, and more particularly to a hydrostatic test device capable of testing or inspecting the structural stability of a casing surrounding a rotor of a steam turbine.

In general, a steam turbine has a structure that allows high pressure and high temperature steam, which is generated from a steam generator, such as a boiler, a heat recovery steam generator (HRSG), or a nuclear reactor, to collide with a turbine blade, thereby rotating a shaft by an impulse or a reaction of the turbine blade.

The steam turbine includes a steam inlet pipe that supplies steam, a high pressure casing that surrounds a rotor and blade rotated by the steam, a last stage blade (LSB), and a lower pressure casing that surrounds a diaphragm. In addition, the high pressure casing is coupled to a main steam inlet to introduce the high temperature and high pressure steam into the high pressure casing, and a main steam entrance is formed in the high pressure casing to couple the main steam inlet to the high pressure casing.

The high pressure casing, which is a pressure vessel that maintains internal pressure (HP) and vacuum pressure (LP), is a structure that supports and protects internal parts. In addition, the high pressure casing guides steam discharged from a main steam pipe.

To this end, the high pressure casing is formed therein with a plurality of feeding holes corresponding to the main steam pipe and a plurality of high pressure (HP) inlets.

Since the high pressure casing is used under high temperature and high pressure operating conditions as described above, the high pressure casing is formed of a thick casting, and has a structure in which an upper casing is coupled to a lower casing.

In addition, since the high pressure casing is used under high temperature and high pressure conditions, the high pressure casing is subject to a hydrostatic test in order to determine if the high pressure casing has the strength to withstand pressure about 15 times greater than operating pressure.

For the hydrostatic test of the high pressure casing, a cylindrical sealing member (or cylinder) is fixedly inserted into a feeding hole of the upper and lower casings and a plurality of pipes are fixed between the upper and lower casings so that the sealing member is not out of the space between the upper and lower casings.

In other words, the pipes are fixedly supported between the upper and lower casings formed therein with the feeding hole, that is, a main steam inlet.

In addition, a circular-shaped plate is fixed to an inner part of the casing to partition the inner part of the casing into a plurality of spaces for water pressure to be measured. Further, the plates are fixed to form spaces having various water pressures to be measured.

Water is fed into the partitioned space (e.g., chamber) to test for water leakage, air tightness, and pressure.

After the sealing member (or cylinder) is fixed into each main stream inlet so that the main stream inlet is sealed, the hydrostatic test is performed at about 250 kgf/cm$^2$.

For example, a hydrostatic test device for a high pressure turbine, in which a plurality of plates, which are spaced apart from each other by a predetermined distance, are provided in a case, and water is fed to a chamber formed between the plates to perform a water pressure test. The hydrostatic test device includes a first water feeding hose formed through the plate so that water is fed to a relevant chamber from an outside, second and third water feeding hoses connected through a case so that water is fed to the plate of the relevant chamber through one chamber, first and second air discharge hoses communicating with each other through the plate so that air existing in the relevant chamber is discharged out, and a third air discharge hose passing through the case so that the air is discharged out in the state that the third air discharge hose communicates with the relevant chamber.

However, according to the hydrostatic test device for the high pressure turbine of the related art, since the sealing member, which seals the main steal inlet, does not independently seal the main seal inlet, the pipe, which fixes the sealing member into the casing, must be additionally fixed into the casing. Since the pipe is a heavy object having a long length of 3 m to 4 m, the pipe is difficult to handle, and working time may be increased.

In addition, the pipe is inclined in the casing during the hydrostatic test, so that the sealing member may not be fixed. Accordingly, an exact hydrostatic test result cannot be obtained. In addition, since the upper and lower casings must be disassembled from each other and assembled with each other again in order to fix the inclined pipe, working time may be increased.

Further, the pipe is moved in the casing during the hydrostatic test, so that the sealing member may be moved. Accordingly, the water pressure is not uniformly maintained, but changed in a hydrostatic test region, so that the reliability of the hydrostatic test may be degraded.

SUMMARY

The present disclosure is made keeping in mind the above-mentioned problems, and an object of the present disclosure is to provide a hydrostatic test device and a hydrostatic test method for a high pressure turbine, capable of performing a hydrostatic test by sealing a feeding hole of upper and lower casings without fixing a pipe used to fix a sealing member between the upper and lower casings of the high pressure turbine.

Another object of the present disclosure is to provide a hydrostatic test device and a hydrostatic test method for a high pressure turbine, capable of performing a hydrostatic test by simply and independently sealing a feeding hole of upper and lower casings.

Still another object of the present disclosure is to provide a hydrostatic test device and a hydrostatic test method for a high pressure turbine, capable of performing a hydrostatic test by sealing a feeding hole of upper and lower casings through the coupling of a bolt.

In order to accomplish the above objects, according to one aspect of the present disclosure, there is provided a hydrostatic test device for a high pressure turbine. The hydrostatic test device may include a plurality of feeding holes formed in upper and lower casings of a high pressure turbine and having groove parts, and sealing members fitted into the feeding holes to seal the feeding holes.

Each sealing member may include an O-ring assembly to seal each feeding hole, and a fitting plate placed on a top surface of the O-ring assembly and fitted into the groove part of the feeding hole.

The hydrostatic test device for the high pressure turbine may further include a fixing plate to fix the O-ring assembly to the fitting plate.

The O-ring assembly may include a body having a surface corresponding to an inner circumferential surface of the feeding hole, and an O-ring fitted around an outer surface of the body.

The body of the O-ring assembly may be formed therein with a fixing hole coupled to a tool allowing the O-ring assembly to be inserted into the feeding hole.

The feeding hole may be provided on an inner circumferential surface thereof with a step part to support a surface of the O-ring assembly opposite to a surface supported by the fitting plate.

The fitting plate may include at least two divided members.

The at least two divided members of the fitting plate may be symmetrical to each other about a longitudinal axis of the O-ring assembly.

The at least two divided members of the fitting plate may be formed by dividing a single material, which has a shape corresponding to a shape of the top surface of the O-ring assembly, at an equal angle about the longitudinal axis of the O-ring assembly.

The O-ring assembly, the fitting plate, and the fixing plate may have a plurality of bolt holes formed therein.

Each divided member of the fitting plate may include a plurality of bolt holes arranged in a triangular shape, and the O-ring assembly and the fixing plate may have a plurality of bolt holes corresponding to the bolt holes formed in the divided member.

According to another aspect of the present disclosure, there is provided a hydrostatic test device for a high pressure turbine, the hydrostatic test device may include a plurality of feeding holes formed in upper and lower casings of the high pressure turbine and having groove parts, sealing members including O-ring assemblies fitted into the feeding holes to seal the feeding holes, fitting plates fitted into the groove parts to support the O-ring assemblies, and fixing plates to support the fitting plates.

The O-ring assemblies may have a plurality of O-rings fixed thereto.

Each fitting plate may include at least two divided members formed by dividing a single material, which may have a shape corresponding to a shape of the O-ring assembly, at an equal angle.

Each O-ring assembly, each fitting plate, and each fixing plate may have a plurality of bolt holes formed at corresponding positions such that the O-ring assembly, the fitting plate, and the fixing plate may be integrally assembled with each other.

Each O-ring assembly may be formed therein with a fixing hole coupled to a tool allowing the O-ring assembly to be inserted into the feeding hole.

According to sill another aspect of the present disclosure, there is provided a hydrostatic pressure method for a high pressure turbine. The hydrostatic pressure method may include fitting an O-ring assembly into a feeding hole of upper and lower casings, fitting a fitting plate, which may be divided into a plurality of members, into a groove part of the feeding hole such that the O-ring assembly is within the feeding hole, coupling a fixing plate having a circular plate shape to one surface of the fitting plate, coupling a bolt to one surface of the fixing plate to integrally fix the fitting plate and the O-ring assembly to the one surface of the fixing plate, and performing a hydrostatic test by filling water in the upper and lower casings.

The step of fitting the O-ring assembly may include coupling a tool to a fixing hole formed in the O-ring assembly, and inserting the O-ring assembly into the feeding hole by using the tool.

The step of fitting the fitting plate may include moving the fitting plate toward a groove part expanded outward from a center of the feeding hole.

The divided members of the fitting plate may be symmetrical to each other about a longitudinal axis of the O-ring assembly.

As described above, according to the hydrostatic test device for the high pressure turbine of the present disclosure, the sealing members may be fixed into the feeding holes of the upper and lower casings, so that the hydrostatic test can be simply performed, and the sealing members can be easily coupled or separated from the feeding holes according to the hydrostatic tests. The handling or the fixing of a pipe having a length of 3 m to 4 m to fix the sealing members into the feeding holes is not required, so that the working time for the hydrostatic test can be reduced.

In addition, the fixing of the sealing members does not depend on the pipe between the casings, but the sealing members independently seal the feeding holes, so that water pressure can be more uniformly maintained in the hydrostatic test, so that the reliability of the hydrostatic test can be improved.

DETAILED DESCRIPTION

Hereinafter, a hydrostatic test device for a high pressure turbine according to an exemplary embodiment of the present disclosure will be described in detail with reference to accompanying drawings.

Figure 1:
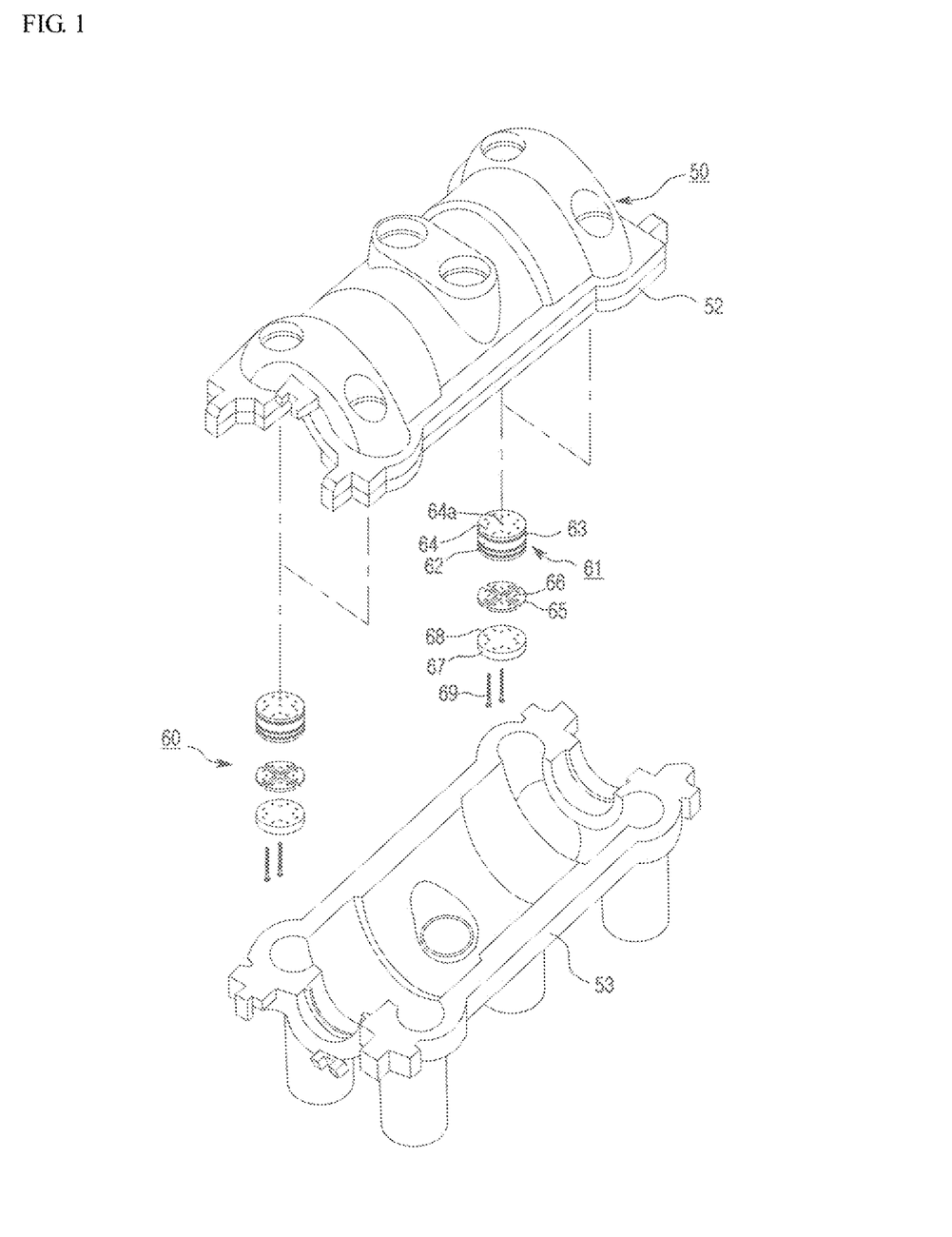
FIG. 1 is an exploded perspective view showing a hydrostatic test device for a high pressure turbine according to an exemplary embodiment of the present disclosure.
Figure 2:
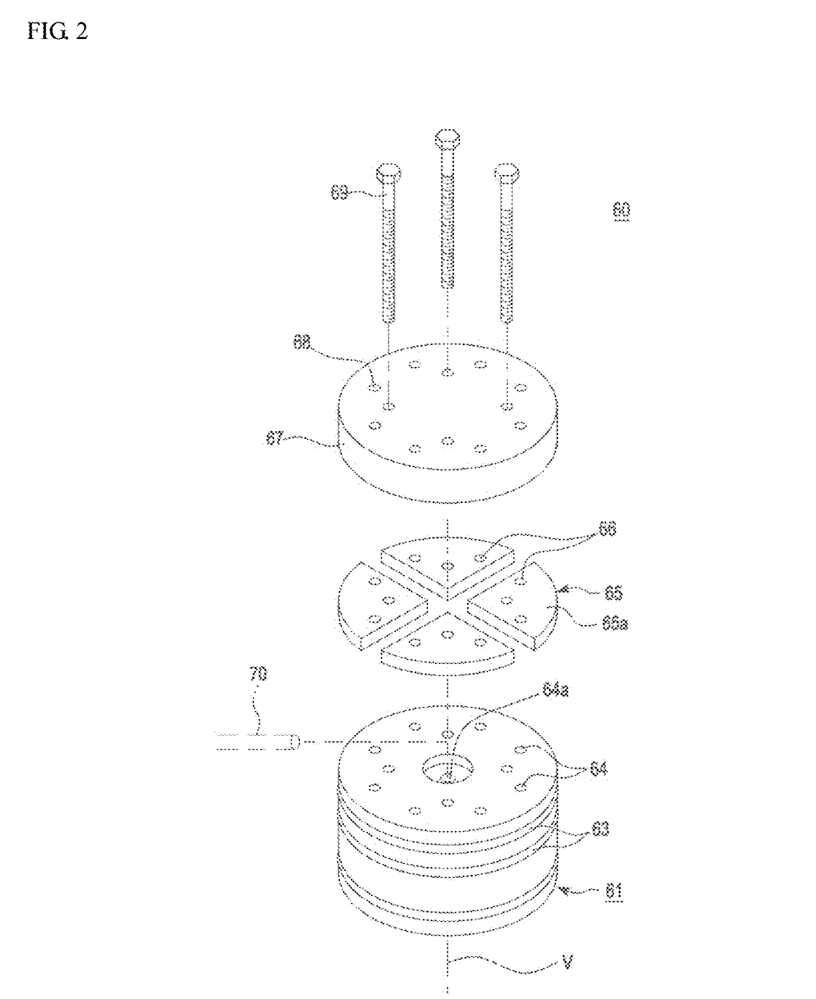
FIG. 2 is an exploded perspective view showing a hydrostatic test device for the high pressure turbine according to an exemplary embodiment of the present disclosure.

FIG. 1 is an exploded perspective view showing a hydrostatic test device for a high pressure turbine according to an exemplary embodiment of the present disclosure. FIG. 2 is an exploded perspective view showing the hydrostatic test device for the high pressure turbine according to an exemplary embodiment of the present disclosure.

Figure 3A:
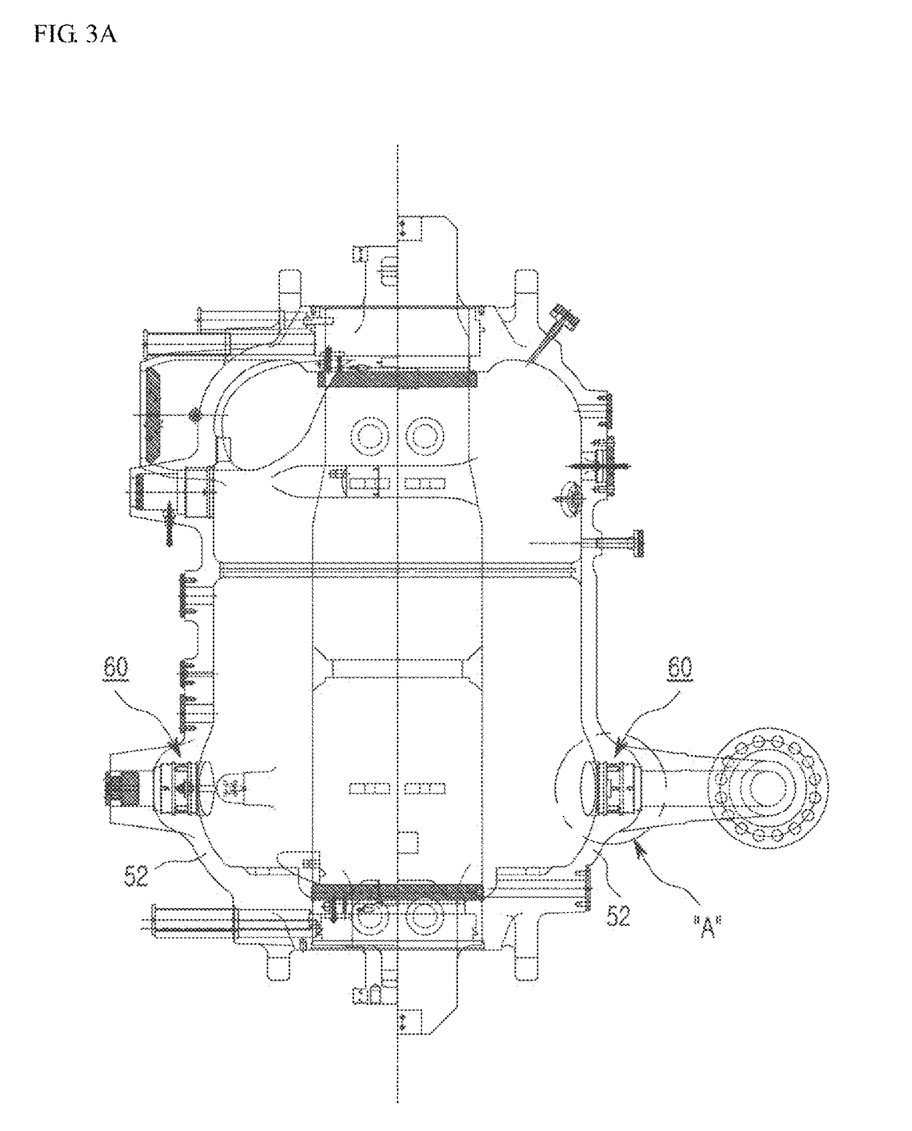
FIG. 3A is a sectional view showing a hydrostatic test device according to an exemplary embodiment of the disclosure, which is installed in a high pressure turbine casing.
Figure 3B:
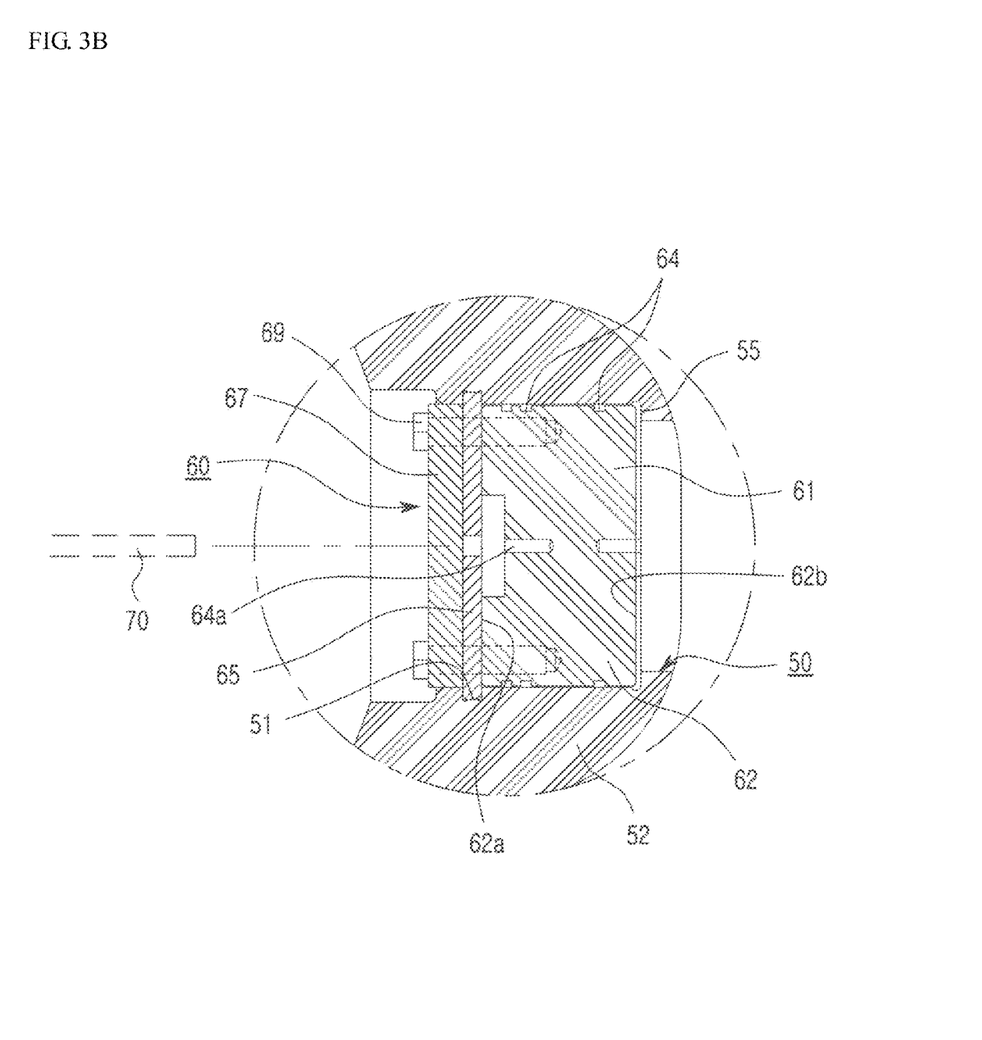
FIG. 3B is an enlarged view showing a part A of FIG. 3A.

The hydrostatic test device for the high pressure turbine according to an exemplary embodiment of the present disclosure may include a plurality of feeding holes formed in upper and lower casings of the high pressure turbine and having groove parts 51 and sealing members 60 fixedly fitted into the feeding holes 50 to seal the feeding holes 50, respectively (see, e.g., FIG. 3B).

Referring to FIG. 1, the high pressure turbine includes an upper casing 52 and a lower casing 53 that support a rotor (not shown) therein. The upper and lower casings 52 and 53 are formed with a plurality of feeding holes 50 defined therein to introduce or discharge high pressure steam from a main steam pipe (not shown).

Figure 4:
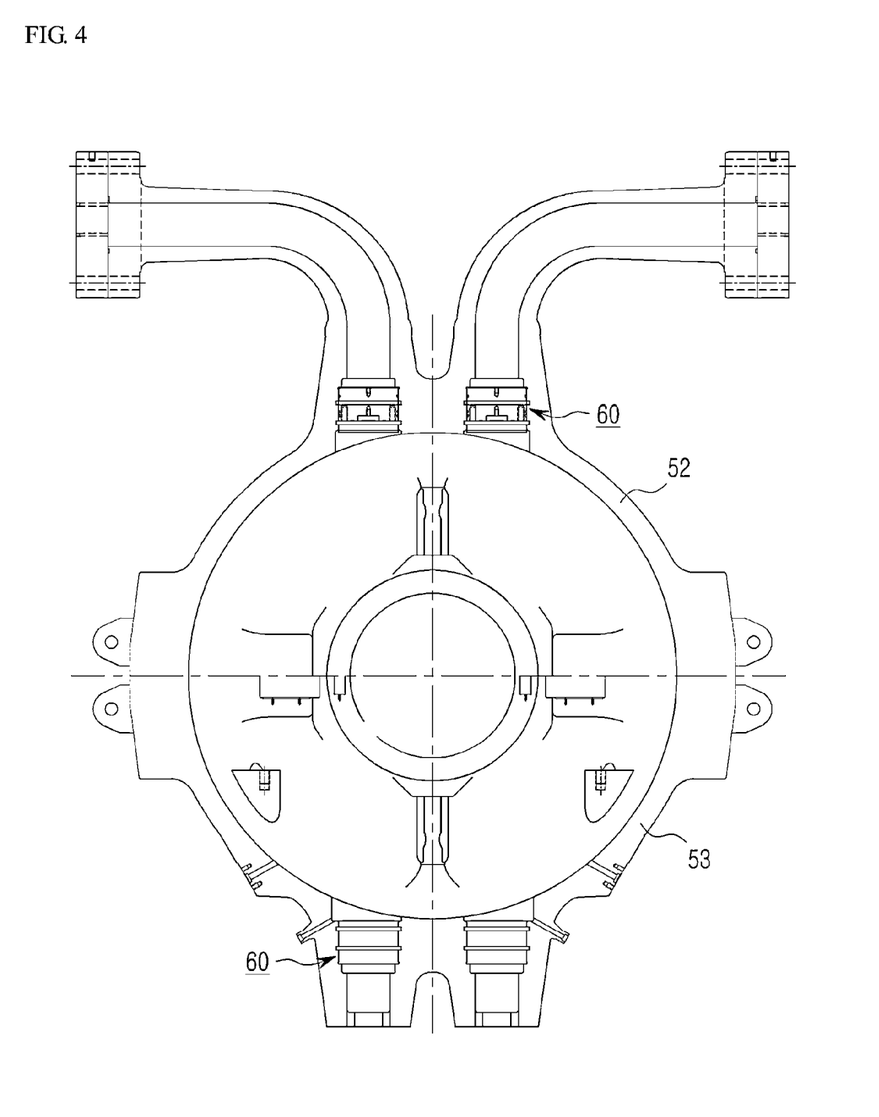
FIG. 4 is a sectional view showing the hydrostatic test device according to an exemplary embodiment of the disclosure, which is installed in a high pressure turbine casing.

A part having the feeding hole 50 protrudes out of the upper casing 52 or the lower casing 53. The thickness of the part having the feeding hole 50 is thicker than that of another part of the upper casing 52 or the lower casing 53. FIG. 3A is a sectional view showing the hydrostatic test device according to the exemplary embodiment of the disclosure, which is installed in a high pressure turbine casing. FIG. 3B is an enlarged view showing a part A of FIG. 3A. FIG. 4 is a sectional view showing the hydrostatic test device according to the exemplary embodiment of the disclosure, which is installed in a high pressure turbine casing.

Referring to FIGS. 3A, 3B, and 4, the groove part 51 is formed in an internal surface of the feeding hole 50 and has a diameter greater than that of the feeding hole 50.

The groove part 51, which has a diameter greater than that of the feeding hole 50, is formed at a predetermined thickness to the extent that a fitting plate 65 of a sealing member 60 is fitted into the groove part 51

In addition, the sealing member 60 is fixed to the feeding hole 50 to seal the feeding hole 50. Referring to FIGS. 1 to 4, the sealing member 60 may include an O-ring assembly 61 to seal the feeding hole 50, the fitting plate 65 to securely fix the O-ring assembly 61, and a fixing plate 67 fixed to a top surface of the fitting plate 65.

The O-ring assembly 61 includes a body 62 having a diameter substantially equal to that of the feeding hole 50 and an O-ring 63 fitted around an outer surface of the body 62. The body 62 has the shape of a cylinder having a predetermined length to seal the feeding hole 50.

At least one O-ring 63 is fixed to an outer surface of the body 62. The O-ring 63 is fixed to the outer surface of the body 62 thereby preventing a gap form being formed between the body 62 and the feeding hole 50. The O-ring 63 may seal the feeding hole 50.

A plurality of bolt holes 64 are formed in a top surface of the body 62, and arranged in a predetermined shape. For example, the bolt holes 64 may be arranged in a substantially triangular shape.

The body 62, which may have a circular shape, may be divided crosswise to form, for example, four divided regions. The bolt holes 64 may be arranged in the triangular shape corresponding to each edge of each divided region. In addition, a fixing hole 64a may be formed at the center of the top surface of the body 62. The fixing hole 64a allows the O-ring assembly 61 to be inserted into the feeding hole 50 at an appropriate depth when the O-ring assembly 61 is inserted into the feeding hole 50, and also fixes a tool 70 used to withdraw the O-ring assembly 61 from the feeding hole 50 after the hydrostatic test has been finished. In other words, the fixing hole 64a is used for the coupling to the tool 70, such as a bolt (shown in dashes) having a predetermined length. The tool 70 assists a worker to insert the O-ring assembly 61 into the feeding hole 50. The tool 70 may have various structures including the bolt, and the fixing hole 64a may be modified in various shapes corresponding to the shape of the tool 70.

A step part 55 (see FIG. 3B) may be formed on an inner circumferential surface of the feeding hole 50 to support the body 62 of the O-ring assembly 61. The step part 55 supports a surface 62b opposite to one surface 62a of the body 62 supported by the fitting plate 65.

The fitting plate 65 may include at least two divided members 65a. The fitting plate 65 may have a shape formed by dividing a single material, which has a shape substantially corresponding to that of the top surface of the body 62 of the O-ring assembly 61, at an equal angle at least one time.

The divided members 65a of the fitting plate 65 may have shapes corresponding to each other about a longitudinal axis V of the O-ring assembly 61. Through the above structure, the O-ring assembly 61 may be substantially uniformly supported against water pressure.

According to one embodiment of the present disclosure, the fitting plate 65 has a structure in which a circular shape is divided into, for example, four members at equal angles. The fitting plate 65 is configured to be inserted into the groove part 51 of the feeding hole 50. The fitting plate 65 has a plurality of bolt holes 66 formed corresponding to the bolt holes 64 of the body 62.

The fixing plate 67 is formed in the shape of a circle having a predetermined thickness. The fixing plate 67 is formed with bolt holes 68 defined therein corresponding to the bolt holes 64 of the body 62 and the bolt holes 66 of the fitting plate 65.

Bolts 69 may be provided to integrally assemble the O-ring assembly 61, the fitting plate 65, and the fixing plate 67 with each other.

Figure 5:
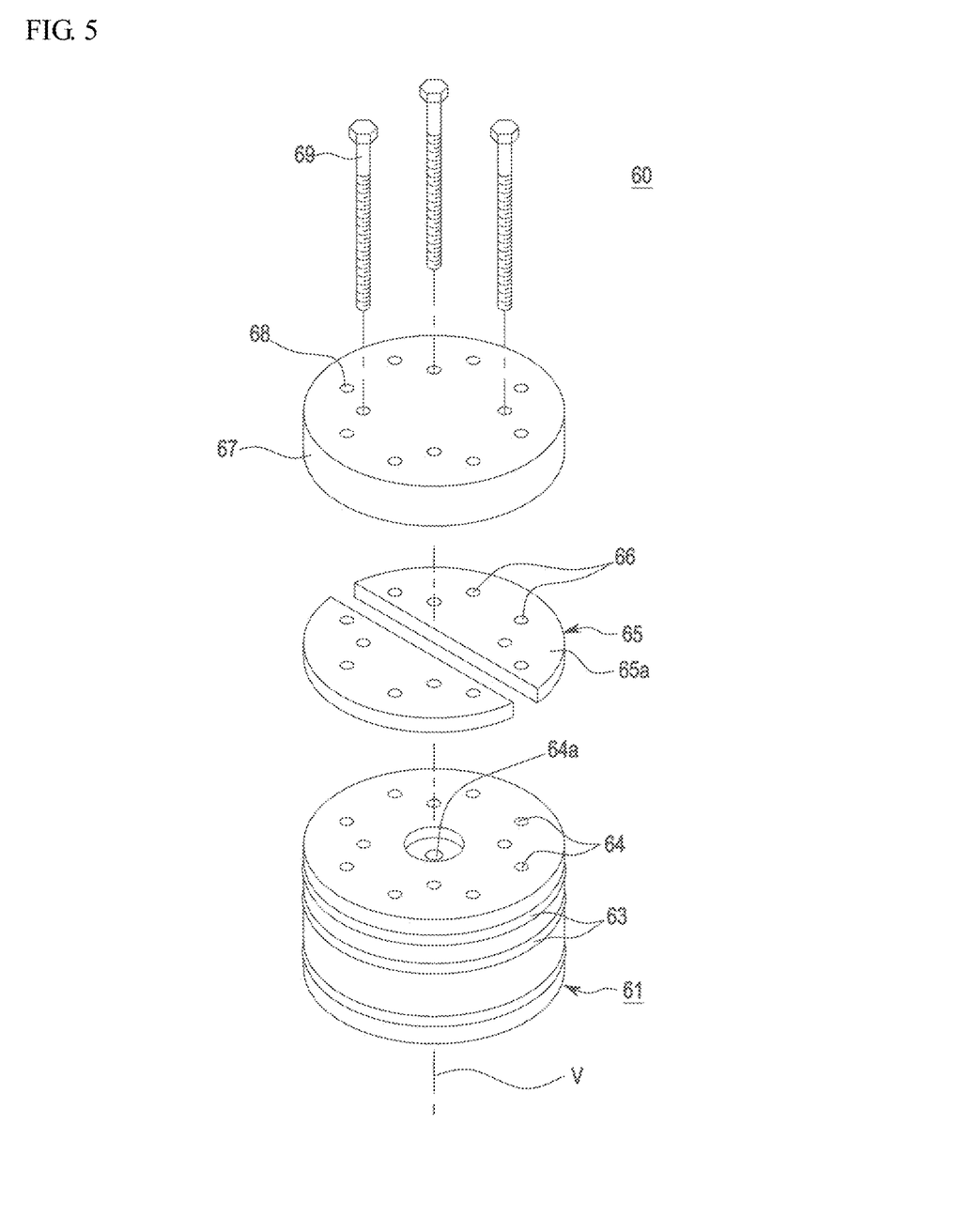
FIG. 5 is an exploded perspective view showing a hydrostatic test device for a high pressure turbine according to another embodiment of the present disclosure.

FIG. 5 is an exploded perspective view showing a hydrostatic test device for a high pressure turbine according to another embodiment of the present disclosure.

The hydrostatic test device for high pressure turbine shown in FIG. 5 includes a sealing member 60 according to another embodiment. The sealing member 60 includes the O-ring assembly 61 and the fixing plate 67 the same as described above but having a different shape for the fitting plate 65. Accordingly, the details of the O-ring assembly 61 and the fixing plate 67 will be omitted in the following description.

The fitting plate 65 has a structure in which a circular shape is divided into two members at equal angles. The fitting plate 65 has a plurality of bolt holes 66. The bolt holes 64 and 68 of the O-ring assembly 61 and the fixing plate 67 are formed to correspond to the bolt holes 66 of the fitting plate 65 (for example having the same pattern for each divided part).

Hereinafter, the coupling relationship of the hydrostatic test device for the high pressure turbine according to an exemplary embodiment of the present disclosure will be described in detail.

Referring to FIGS. 1 to 5, the upper and lower casings 52 and 53 are formed with a plurality of feeding holes 50 defined therein that couple to a main steam pipe (not shown). The groove part 51 is formed in the feeding hole 50 and has a diameter greater than that of the feeding hole 50.

The sealing member 60 includes a body 62 having a diameter substantially equal to that of the feeding hole 50 and has a cylindrical shape. A plurality of O-rings 63 are disposed on an outer surface of the body 62. In order to secure the O-ring 63, a groove is formed in the body 62 so that the O-ring 63 is fitted into the groove.

As described above, the O-rings 63 are fitted around an outer surface of the body 62, thereby providing the O-ring assembly 61.

In addition, the circular-shaped top surface of the body 62 is divided into several (for example, two or four) regions by, for example, virtual central lines, and the bolt holes 64 are formed in each divided region. In some examples, at least three bolt holes 64 are formed in each divided region and arranged in a substantially triangular shape.

The bolt hole 64 may integrally fix the fitting plate 65 and the fixing plate 67.

The fixing hole 64a may be formed in the center of one surface of the body 62 so that the O-ring assembly 61 is detachably coupled to the feeding hole 50. A thread (not shown) may be formed in the fixing hole 64a so that the tool 70, such as a bolt, may be coupled to the fixing hole 64a.

The fitting plate 65 may have several (for example, two or four) members. The fitting plate 65 may be divided at equal angles if the combination of the divided members forms a circular shape. The fitting plate 65 can be easily inserted into the groove part 51.

In addition, the fixing plate 67 has the shape of a circle having a predetermined thickness. The fixing plate 67 has the bolt holes 68 corresponding to the bolt holes 64 of the body 62 and the bolt holes 67 of the fitting plate 65.

The bolt holes 64, 66, and 68 are formed at positions corresponding to each other, and a plurality of bolts 69 to be coupled to the bolt holes 64, 66, and 68 may be provided.

Figure 6:
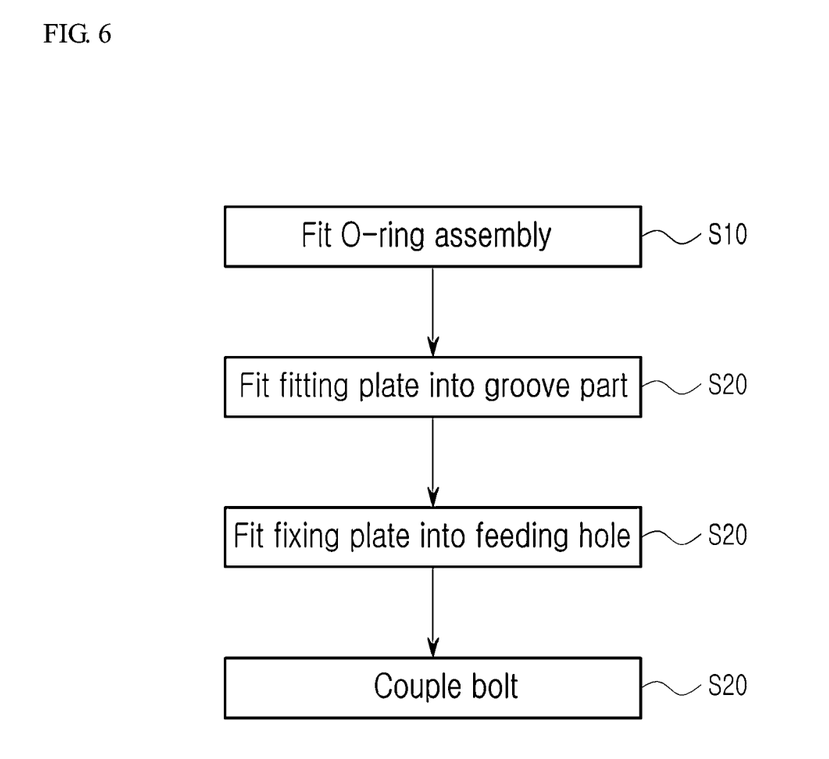
FIG. 6 is a flowchart showing a method of fixing a hydrostatic test device according to an exemplary embodiment of the present disclosure.

Hereinafter, a hydrostatic test method for a hydrostatic test turbine according to an exemplary embodiment of the present disclosure will be described with reference to FIG. 6.

With reference to FIGS. 1 to 5, the upper and lower casings 52 and 53, in which the turbine is mounted, are assembled with each other such that the upper and lower casings 52 and 53 tightly make contact with each other, and a sealing member (not shown), such as a packing, is fixedly interposed between the upper and lower casings 52 and 53.

Sealing members 60 are fixedly inserted into the feeding holes 50 of the upper and lower casings 52 and 53, respectively. The body 62 of the sealing member 60 having the O-ring 63 fixed thereto is fitted into the feeding hole 50 (step S10).

The body 62 is fitted into the groove part 51 so that one surface of the body 62 is positioned in the groove part 51. The detachably coupling of the O-ring assembly 61 to the feeding hole 50, that is, the fitting of the O-ring assembly 61 into the feeding hole 50 or the separation of the O-ring assembly 61 from the feeding hole 50, may be performed by coupling the tool 70, such as a long bolt, to the fixing hole 64a, so that the O-ring assembly 51 is fitted into the feeding hole 50 at an appropriate depth.

Thereafter, the fitting plate 65 may be fixedly coupled to the top surface of the O-ring assembly 61. The fitting plate 65 may be fixedly fitted into the groove part 51 of the feeding hole 50 (step S20).

The above term "the top surface of the O-ring assembly 61" has been described with reference to FIG. 2. Hereinafter, the term "top surface", or "bottom surface" will be described with reference to FIG. 2 for the illustrative purpose.

Since the fitting plate 65 is divided into a plurality of members at, for example, equal angles, after the fitting plate 65 is inserted into the feeding hole 50, the members of the fitting plate 65 may be positioned radially outward to tightly make contact with an inner surface of the groove part 51 and fixed to the inner surface of the groove part 51. In this case, each arc part (e.g., member) of the fitting plate 65 may be fixedly fitted into the groove part 51.

The fitting plate 65 may be inserted into the feeding hole 50 in such a manner that the fixing plate 67 having the shape of a circular plate tightly makes contact with the top surface of the fitting plate 65 (step S30).

In addition, the bolts 69 are coupled to the fixing plate 67, the fitting plate 65, and the O-ring assembly 61, so that the fixing plate 67, the fitting plate 65, and the O-ring assembly 61 are integrally assembled with each other (step S40). Note that the pattern of the holes in the fitting plate 65 may be arranged such that the holes line up with the fixing plate 67 and the O-ring assembly 61 in the state in which the members are positioned radially outward in the groove part 51. The holes in the fitting plate 65 may be more radially inward than the holes of the fixing plate 67 and the O-ring 61 in an unexpanded state where the outer circumference corresponds with that of the fixing plate 67 and the O-ring 61.

Accordingly, the bolts 69 integrally fix the O-ring assembly 61, the fitting plate 65, and the fixing plate 67 to each other in a state in which the members of the fitting plate 65 are disposed in the groove part 51.

Water may be supplied to a predetermined position of the upper and lower casings 52 and 53 through a hose (not shown), and filled in the upper and lower casings 52 and 54 to perform the hydrostatic test.

The structure strength of the upper and lower casings 52 and 53 may be inspected (checked) according to the occurrence of water leakage, an air tightness state, and a pressure under high temperature and high pressure operating conditions through the hydrostatic test.

After the hydrostatic test has been finished, the bolts 69 may be released, the fixing plate 67 may be disassembled from the fitting plate 65, and the O-ring assembly 61 may be disassembled from the feeding hole 50 by using the tool 70, such as a long bolt.

Although the present invention has been described in detail according to the embodiments, it is not limited to the above the embodiments. It will be understood by those of ordinary skill in the art that the embodiments may be partially or totally combined with each other and various modifications of the embodiments may be made without departing from the scope of the subject matter of the present invention.

Further, the embodiments discussed have been presented by way of example only and not limitation. Thus, the breadth and scope of the invention (s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention (s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A hydrostatic test device for a high pressure turbine, comprising:
    a plurality of feeding holes defined in upper and lower casings of the high pressure turbine, the feeding holes having grooves defined therein to receive a fitting plate, the grooves having a diameter greater than that of the feeding hole; and
    a plurality of sealing members that fit into the feeding holes to seal the feeding holes, wherein each sealing member comprises:
        an O-ring assembly that seals to a respective feeding hole; and
        the fitting plate that fits into the groove of a respective feeding hole when disposed on a first surface of the O-ring assembly.

2. The hydrostatic test device of claim 1, wherein an inner circumferential surface of at least on of the feeding holes includes a step that supports a second surface of a respective O-ring assembly opposite to the first surface.

3. The hydrostatic test device of claim 1, further comprising a fixing plate that fixes the O-ring assembly to the fitting plate.

4. The hydrostatic test device of claim 3, wherein the O-ring assembly, the fitting plate, and the fixing plate have a plurality of bolt holes defined therein.

5. The hydrostatic test device of claim 3, wherein the O-ring assembly comprises:
    a body having an outer surface corresponding to an inner circumferential surface of a respective feeding hole; and
    an O-ring disposed around the outer surface of the body.

6. The hydrostatic test device of claim 5, wherein the body of the O-ring assembly includes a fixing hole defined therein that couples to a tool that inserts the O-ring assembly into the feeding hole.

7. The hydrostatic test device of claim 1, wherein the fitting plate comprises at least two divided members.

8. The hydrostatic test device of claim 7, wherein the at least two divided members of the fitting plate are symmetrical to each other about a longitudinal axis of the O-ring assembly.

9. The hydrostatic test device of claim 8, wherein the at least two divided members of the fitting plate have a shape corresponding to a shape of the first surface of the O-ring assembly divided at an equal angle about the longitudinal axis of the O-ring assembly.

10. The hydrostatic test device of claim 9, wherein each divided member of the fitting plate comprises a plurality of bolt holes defined in a triangular shape, and the O-ring assembly and the fixing plate have a plurality of bolt holes respectively defined therein corresponding to the bolt holes of the divided members.

11. A hydrostatic test device for a high pressure turbine, comprising:
    a plurality of feeding holes defined in upper and lower casings of the high pressure turbine, the feeding holes having grooves defined therein; and
    a plurality of sealing members, each sealing member including
        an O-ring assembly that fits into a respective feeding hole to seal the feeding hole,
        a fitting plate that fits into the groove of the respective feeding hole to support the O-ring assembly, and
        a fixing plate that couple to the fitting plate.

12. The hydrostatic test device of claim 11, wherein the O-ring assemblies each include an O-ring coupled thereto.

13. The hydrostatic test device of claim 11, wherein each fitting plate comprises at least two divided members that have a shape corresponding to a shape of a surface of the O-ring assembly divided at an equal angle.

14. The hydrostatic test device of claim 11, wherein each O-ring assembly, each fitting plate, and each fixing plate have a plurality of bolt holes defined therein at corresponding positions such that the O-ring assembly, the fitting plate, and the fixing plate integrally assemble with each other.

15. The hydrostatic test device of claim 11, wherein each O-ring assembly includes a fixing hole defined therein that couples to a tool that inserts the O-ring assembly into the feeding hole.

16. A hydrostatic pressure test method, comprising:
    fitting an O-ring assembly into a feeding hole defined in an upper or lower casing of a turbine;
    fitting a fitting plate, which includes a plurality of distinct members, into a groove defined in the feeding hole;
    coupling a fixing plate having a circular plate shape to one surface of the fitting plate;
    coupling a bolt to one surface of the fixing plate to integrally fix the fitting plate and the O-ring assembly to the one surface of the fixing plate; and
    performing a hydrostatic test by providing water to the upper or lower casings.

17. The hydrostatic pressure method of claim 16, wherein the fitting the O-ring assembly includes coupling a tool to a fixing hole defined in the O-ring assembly, and inserting the O-ring assembly into the feeding hole by using the tool.

18. The hydrostatic pressure method of claim 16, wherein the fitting the fitting plate includes moving the fitting plate radially outward from a center of the feeding hole toward the groove of the feeding hole.

19. The hydrostatic pressure method of claim 16, wherein the members of the fitting plate are symmetrical to each other about a longitudinal axis of the O-ring assembly.

* * * * *